(12) United States Patent
Millar

(10) Patent No.: US 11,096,342 B2
(45) Date of Patent: Aug. 24, 2021

(54) FLUID DISTRIBUTION MANIFOLDS IN AN ASSEMBLY LINE GROW POD AND METHODS OF PROVIDING FLUIDS VIA FLUID DISTRIBUTION MANIFOLDS

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

(*) Notice: Subject to any disclaimer, the term of this patent is extended or adjusted under 35 U.S.C. 154(b) by 376 days.

(21) Appl. No.: 15/983,839

(22) Filed: May 18, 2018

(65) Prior Publication Data

US 2018/0359969 A1 Dec. 20, 2018

Related U.S. Application Data

(60) Provisional application No. 62/519,391, filed on Jun. 14, 2017.

(51) Int. Cl.
*A01G 27/00* (2006.01)
*A01G 9/24* (2006.01)
(Continued)

(52) U.S. Cl.
CPC .......... *A01G 27/003* (2013.01); *A01C 23/007* (2013.01); *A01C 23/042* (2013.01);
(Continued)

(58) Field of Classification Search
CPC .. A01G 27/003; A01G 27/001; A01G 31/042; A01G 31/045; A01G 31/02; A01G 9/247
See application file for complete search history.

(56) References Cited

U.S. PATENT DOCUMENTS 3,293,799 A * 12/1966 Keller .................. A01G 27/003
47/79
3,327,425 A 6/1967 Dosedla et al.
(Continued)

FOREIGN PATENT DOCUMENTS

EP    1017950 A1 * 7/2000 ......... G05D 16/2095
EP    2944187      11/2015
(Continued)

OTHER PUBLICATIONS

EP-1017950 translation (Year: 2005).*
(Continued)

*Primary Examiner* — Peter M Poon
*Assistant Examiner* — Morgan T Barlow
(74) *Attorney, Agent, or Firm* — Dinsmore & Shohl LLP

(57) ABSTRACT

An assembly line grow pod includes a fluid source and a fluid distribution manifold. The fluid distribution manifold includes a fluid inlet, a plurality of fluid outlets, a plurality of valves coupled within the fluid outlets and movable between an open position and a closed position, a plurality of biasing assemblies coupled to the of valves to bias the valves in the closed position, and a plurality of tension rings coupled to the biasing assemblies to adjust an amount of biasing force applied by the biasing assemblies. Fluid from the fluid source having a fluid pressure that exceeds the biasing force causes the valves to move to the open position such that a specific amount of the fluid is ejected from the fluid outlets.

20 Claims, 9 Drawing Sheets

(51) Int. Cl.
*A01G 31/04* (2006.01)
*B05B 1/30* (2006.01)
*A01C 23/00* (2006.01)
*A01C 23/04* (2006.01)

(52) U.S. Cl.
CPC ............ *A01G 9/247* (2013.01); *A01G 27/001* (2013.01); *A01G 31/042* (2013.01); *B05B 1/3006* (2013.01)

(56) References Cited

U.S. PATENT DOCUMENTS

| | | | | |
|---|---|---|---|---|
| 3,578,431 | A * | 5/1971 | Ingestad et al. | A01G 31/02 71/1 |
| 3,771,258 | A * | 11/1973 | Charney | A01G 9/143 47/65 |
| 3,817,454 | A * | 6/1974 | Pira | A01G 27/003 239/76 |
| 3,824,736 | A * | 7/1974 | Davis | A01G 7/045 47/17 |
| 4,245,433 | A * | 1/1981 | Sjostedt | A01G 31/02 47/59 R |
| 4,336,908 | A * | 6/1982 | Vikre | A01G 25/092 138/46 |
| 4,350,300 | A * | 9/1982 | Vikre | A01G 25/092 239/396 |
| 5,135,174 | A * | 8/1992 | Chaplinsky | A01C 23/042 239/310 |
| 5,452,747 | A | 9/1995 | De Man | |
| 5,611,172 | A * | 3/1997 | Dugan | A01G 7/00 47/1.01 R |
| 5,848,494 | A * | 12/1998 | Spelt | A01G 27/00 47/67 |
| 6,055,771 | A | 5/2000 | Warnacut | |
| 6,279,263 | B1 * | 8/2001 | Lai | A01G 31/02 47/65 |
| 6,314,979 | B1 * | 11/2001 | Lips | A01C 23/042 137/205.5 |
| 6,786,425 | B2 | 9/2004 | Rawlings | |
| 7,063,276 | B2 | 6/2006 | Newton | |
| 7,222,454 | B1 * | 5/2007 | Chen | A01G 27/003 47/48.5 |
| 8,439,282 | B2 | 5/2013 | Allen et al. | |
| 8,627,598 | B1 * | 1/2014 | Souder | A01G 31/042 47/65 |
| 8,986,417 | B1 * | 3/2015 | Miller | C05G 5/20 71/28 |
| 9,119,353 | B1 * | 9/2015 | Richardson | B05B 1/3006 |
| 9,795,097 | B2 | 10/2017 | Williams et al. | |
| 10,136,587 | B1 * | 11/2018 | Johnson | A01G 7/02 |
| 10,264,737 | B2 * | 4/2019 | Johansson | A01G 7/045 |
| 2004/0045218 | A1 * | 3/2004 | Muxlow | A01G 27/003 47/79 |
| 2006/0027283 | A1 * | 2/2006 | Gauthier | A01G 27/008 141/95 |
| 2009/0090796 | A1 * | 4/2009 | Tian | A01G 25/09 239/726 |
| 2011/0219685 | A1 * | 9/2011 | Goldman | A01G 27/006 47/58.1 R |
| 2012/0005957 | A1 * | 1/2012 | Downs, Sr. | A01G 31/02 47/62 A |
| 2015/0216116 | A1 * | 8/2015 | Hirai | A01C 11/00 47/1.01 P |
| 2016/0067722 | A1 | 3/2016 | Nelson et al. | |
| 2016/0128289 | A1 * | 5/2016 | Wong | G05B 19/041 47/62 A |
| 2016/0192594 | A1 * | 7/2016 | Mawendra | A01G 31/042 47/62 R |
| 2017/0251613 | A1 | 9/2017 | Bermudez Rodriguez et al. | |
| 2017/0347538 | A1 * | 12/2017 | Nakajima | A01G 27/00 |
| 2018/0014475 | A1 * | 1/2018 | Gomi | A01G 9/18 |
| 2018/0328513 | A1 * | 11/2018 | Emory | A01G 27/003 |
| 2018/0343812 | A1 * | 12/2018 | Leo | F02C 3/04 |
| 2019/0021238 | A1 * | 1/2019 | Alexander | A01G 31/042 |
| 2019/0029200 | A1 * | 1/2019 | Mawendra | A01G 20/30 |

FOREIGN PATENT DOCUMENTS

| | | | | |
|---|---|---|---|---|
| GB | 1035136 | A * | 7/1966 | ........... A01G 27/003 |
| GB | 2121263 | | 12/1983 | |
| WO | WO-0052994 | A2 * | 9/2000 | ........... A01C 23/042 |
| WO | WO-2011007928 | A1 * | 1/2011 | ............... A01G 7/06 |

OTHER PUBLICATIONS

PCT International Search Report and Written Opinion of the International Searching Authority for PCT/US18/33797, dated Nov. 21, 2018, 16 pages.

"Engineering Essentials: Pressure-Control Valves." Hydraulics & Pneumatics, Jan. 1, 2012, https://www.hydraulicspneumatics.com/200/TechZone/HydraulicValves/Article/False/6411/TechZone-HydraulicValves. Accessed Nov. 9, 2018.

Aeroponics is simply the most efficient way to grow massive healthy plants; retrieved on Mar. 14, 2018 from www.flowforth.com/images%20folder/ebay/aeropodebay.rtf.

* cited by examiner

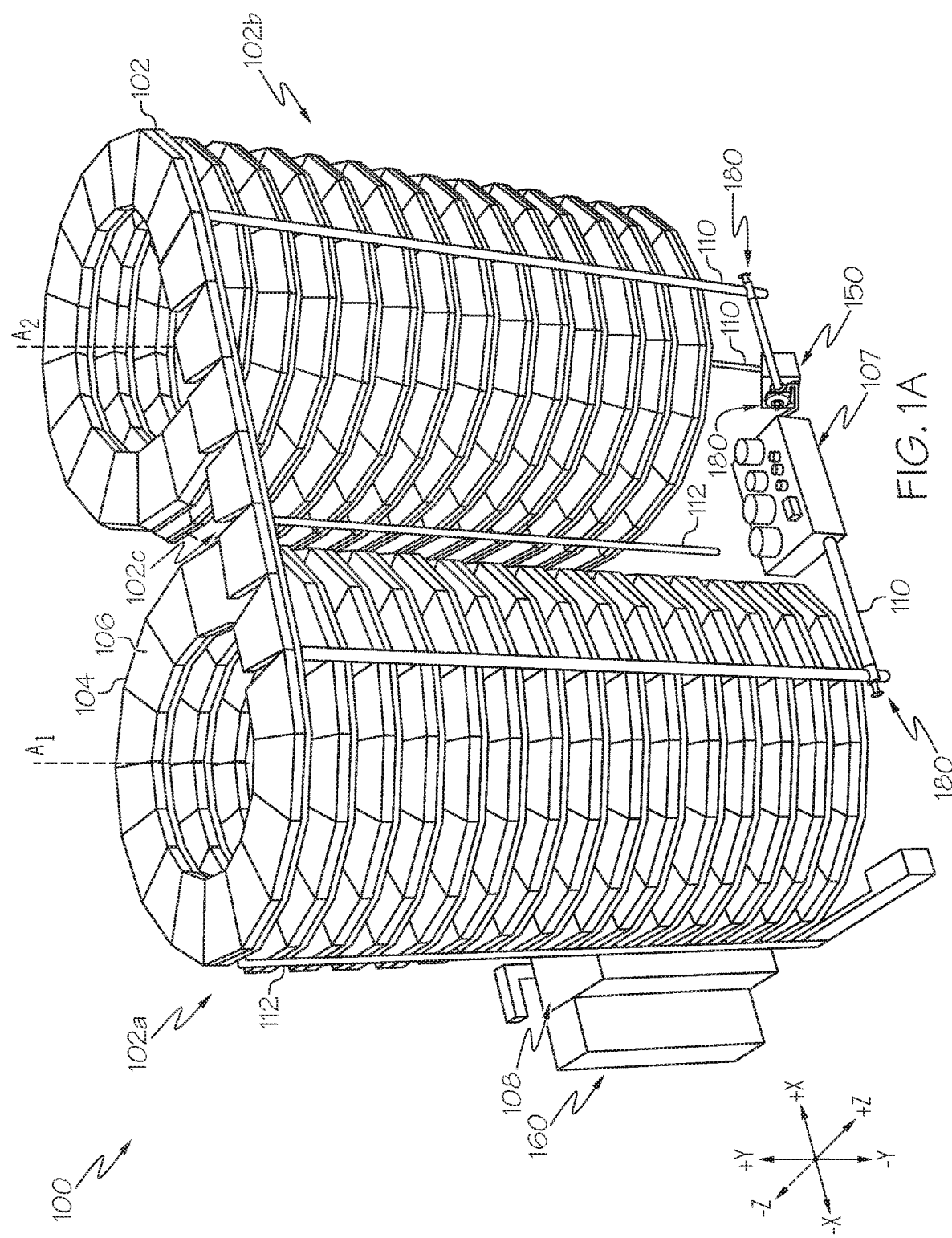

FLUID DISTRIBUTION MANIFOLDS IN AN ASSEMBLY LINE GROW POD AND METHODS OF PROVIDING FLUIDS VIA FLUID DISTRIBUTION MANIFOLDS

CROSS REFERENCE TO RELATED APPLICATION

This application claims the benefit of U.S. Provisional Application Ser. No. 62/519,391, filed on Jun. 14, 2017, which is incorporated by reference in its entirety.

TECHNICAL FIELD

Embodiments described herein generally relate to systems and methods for providing fluids in an assembly line grow pod and, more specifically, to use of a fluid distribution manifold in an assembly line grow pod to provide a measured amount of fluid.

BACKGROUND

Industrial grow pods that are used to continuously grow crops may utilize an assembly line of carts that continuously traverse a track as plant seeds are planted, grown, and harvested, and then continue to traverse the track as the carts (and/or trays thereon) are cleaned and washed to repeat the process. To ensure smooth operation of the industrial grow pod, it may be necessary to ensure that precise amounts of fluids are supplied to plants, shoots, and seeds within the grow pod (such as water, nutrients, ambient air conditions, and the like) at a particular time to ensure optimum growth, to avoid excess fluid (e.g., runoff), and/or the like. Current solutions may provide watering and nutrient distribution, but often fail to provide specific and customized water and distribution to plants, shoots, and seeds.

SUMMARY

Devices, systems, and methods for providing a predetermined amount of fluid in an assembly line grow pod are disclosed. One embodiment includes an assembly line grow pod having a fluid source and a fluid distribution manifold. The fluid distribution manifold includes a fluid inlet fluidly coupled to the fluid source, a plurality of fluid outlets fluidly coupled to the fluid inlet, a plurality of valves, each one of the plurality of valves coupled within a fluid outlet of the plurality of fluid outlets and movable between an open position and a closed position, a plurality of biasing assemblies, each one of the plurality of biasing assemblies coupled to each one of the plurality of valves to bias each one of the plurality of valves in the closed position, and a plurality of tension rings, each one of the plurality of tension rings coupled to each one of the plurality of biasing assemblies to adjust an amount of biasing force applied by each one of the biasing assemblies. Fluid from the fluid source having a fluid pressure that exceeds the biasing force applied by each one of the biasing assemblies causes each one of the plurality of valves to move to the open position such that a specific amount of the fluid is ejected from each one of the plurality of fluid outlets.

In another embodiment, a water distribution manifold in an assembly line grow pod includes a body defining a cavity, a fluid inlet fluidly coupled to the cavity, the fluid inlet receiving fluid from a fluid source, a plurality of fluid outlets fluidly coupled to the cavity, a plurality of valves, each one of the plurality of valves coupled within a fluid outlet of the plurality of fluid outlets and movable between an open position and a closed position, a plurality of biasing assemblies, each one of the plurality of biasing assemblies coupled to each one of the plurality of valves to bias each one of the plurality of valves in the closed position, and a plurality of tension rings, each one of the plurality of tension rings coupled to each one of the plurality of biasing assemblies to adjust an amount of biasing force applied by each one of the biasing assemblies. Fluid that is received via the fluid inlet has a fluid pressure that exceeds the biasing force applied by each one of the biasing assemblies, which causes each one of the plurality of valves to move to the open position such that a specific amount of the fluid is ejected from each one of the plurality of fluid outlets.

In yet another embodiment, a method of providing a predetermined amount of fluid in an assembly line grow pod includes moving a cart supporting a tray having a plurality of seeds, shoots, or plants therein along a track adjacent to a fluid distribution manifold comprising a plurality of tunable check valves coupled to a plurality of fluid outlets, determining a tension ring setting for each one of the plurality of tunable check valves that will result in ejection of the predetermined amount of fluid from the fluid outlets into the tray, adjusting the plurality of tunable check valves according to the tension ring setting, and directing fluid at a predetermined flow rate and pressure into the fluid distribution manifold. The pressure of the fluid overcomes a biasing force of the tunable check valves and causes the predetermined amount of fluid to be distributed into the tray.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 1A schematically depicts a front perspective view of an illustrative assembly line grow pod having a fluid distribution manifold according to one or more embodiments shown and described herein;

DETAILED DESCRIPTION

Embodiments disclosed herein include devices, systems, and methods for distributing a precise amount of fluid to each cell of a plurality of cells of a tray on a cart supported on a track in an assembly line grow pod. The assembly line grow pod may include a plurality of carts that follow the track. The devices, systems, and methods may be embodied as a water distribution manifold, which, in addition to one or more other components in the assembly line grow pod, directs a specific amount of water and/or nutrients are supplied to ensure optimum growth of the seeds, shoots, and/or plants as the trays traverse the track. The water distribution manifold may be controlled by a control component of the assembly line grow pod, such as a master controller. In some embodiments, particular embodiments where more than water (e.g., water and nutrients) are supplied, the water distribution manifold may be referred to as a fluid distribution manifold.

Figure 1B:
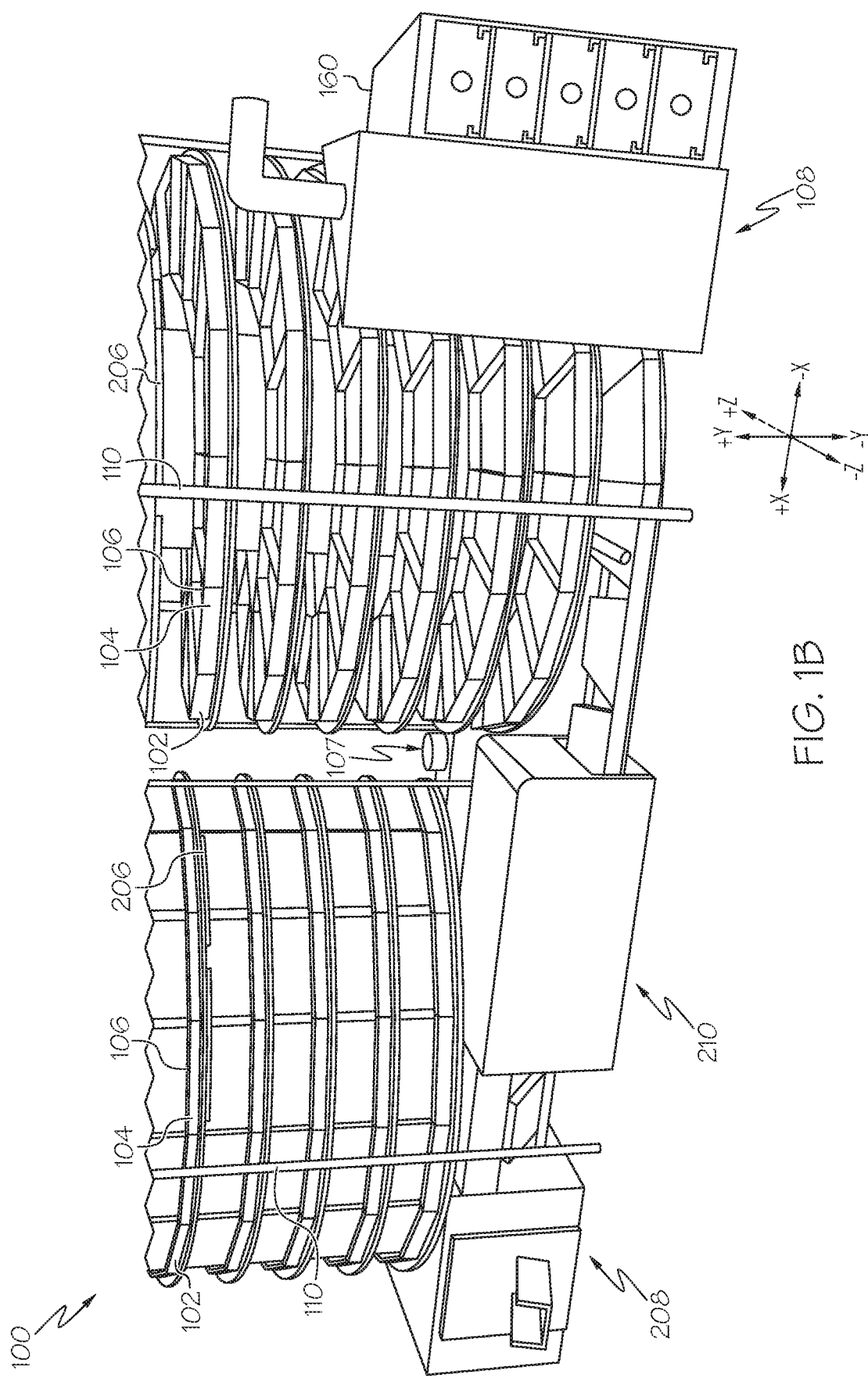
FIG. 1B schematically depicts a rear perspective view of a portion of an illustrative assembly line grow pod having a fluid distribution manifold according to one or more embodiments shown and described herein.

An illustrative industrial grow pod that allows for the continuous, uninterrupted growing of crops is depicted herein. Particularly, FIG. 1A depicts a front perspective view of an illustrative assembly line grow pod 100 having a fluid distribution manifold according to one or more embodiments shown and described herein. In addition. FIG. 1B depicts a rear perspective view of a portion of the assembly line grow pod 100. As illustrated in FIGS. 1A and 1B, the assembly line grow pod 100 may include a track 102 that holds one or more carts 104. Referring particularly to FIG. 1A, the track 102 may include at least an ascending portion 102a, a descending portion 102b, and a connection portion 102c. The track 102 may wrap around (e.g., in a counterclockwise direction, as shown in FIG. 1A) a first axis $A_1$ such that the carts 104 ascend upward in a vertical direction (e.g., in the +y direction of the coordinate axes of FIG. 1A). The connection portion 102c may be relatively level (although this is not a requirement) and is utilized to transfer carts 104 to the descending portion 102b. The descending portion 102b may be wrapped around a second axis $A_2$ (e.g., in a counterclockwise direction, as shown in FIG. 1A) that is substantially parallel to the first axis $A_1$, such that the carts 104 may be returned closer to a ground level.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

Referring to FIG. 1A, supported on each one of the carts 104 is a tray 106. The tray 106 may generally contain one or more components for holding seeds as the seeds germinate and grow into plants as the cart 104 traverses the ascending portion 102a, the descending portion 102b, and the connection portion 102c of the track 102 of the assembly line grow pod 100. The seeds may be planted, allowed to grow, and then may be harvested by various components of the assembly line grow pod 100, as described in greater detail herein. In addition, the seeds (and thereafter the shoots and plants) within the trays 106 may be monitored, provided with water, nutrients, environmental conditions, light, and/or the like to facilitate growing.

Also depicted in FIGS. 1A and 1B is a control component 160. The control component 160 may include, among other things, control hardware for controlling various components of the assembly line grow pod 100, as described in greater detail herein. In some embodiments, the control component 160 may be arranged as a modular control interface that receives a plurality of hot-swappable control modules, as described in greater detail herein. In some embodiments, the control component 160 may be particularly configured to control operation of a fluid distribution manifold, as described in greater detail herein.

Coupled to the control component 160 is a seeder component 108. The seeder component 108 may be configured to place seeds in the trays 106 supported on the one or more carts 104 as the carts 104 pass the seeder component 108 in the assembly line. Depending on the particular embodiment, each cart 104 may include a single section tray 106 for receiving a plurality of seeds. Some embodiments may include a multiple section tray 106 for receiving individual seeds in each section (or cell). In the embodiments with a single section tray 106, the seeder component 108 may detect the presence of the respective cart 104 and may begin laying seed across an area of the single section tray 106. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged. Such a pre-treatment of seeds may be completed by a fluid distribution manifold, as described in greater detail herein.

In the embodiments where a multiple section tray 106 is utilized with one or more of the carts 104, the seeder component 108 may be configured to individually insert seeds into one or more of the sections of the tray 106. Again, the seeds may be distributed on the tray 106 (or into individual cells) according to a desired number of seeds, a desired area the seeds should cover, a desired depth of seeds, etc.

Referring to FIG. 1A, the assembly line grow pod 100 may also include a watering component 107 coupled to one or more water lines 110 (e.g., fluid lines) via one or more pumps 150 and/or one or more flow control valves 180 in some embodiments. While only a single pump 150 is depicted in FIG. 1A, it should be understood that the assembly line grow pod 100 may incorporate a plurality of pumps 150 in some embodiments. Likewise, while a plurality of flow control valves 180 are depicted in FIG. 1A, it should be understood that the assembly line grow pod 100 may incorporate a single flow control valve 180 in some embodiments. The watering component 107, the one or more pumps 150, the one or more flow control valves 180, and the one or more water lines 110 may distribute water and/or nutrients to one or more water distribution manifolds (not shown) located at various locations within the assembly line grow pod 100, which then distribute a precise amount of water and/or nutrients to trays 106 as described in greater detail herein. In some embodiments, the control component may be communicatively coupled to the watering component 107, the one or more pumps 150, and the one or more flow control valves 180 such that the control component transmits signals for the operation of the watering component 107, the one or more pumps 150, and the one or more flow control valves 180 to selectively control flow and/or pressure of fluid accordingly, as described herein.

For example, the one or more water lines 110 may extend between the watering component 107 and one or more watering stations having one or more water distribution manifolds and arranged at particular locations within the assembly line grow pod 100 such that the pumps 150 connected in line with the water lines 110 pump water and/or nutrients to the one or more watering stations and into the one or more fluid distribution manifolds and the one or more flow control valves 180 direct flow of the water and/or nutrients to the water distribution manifolds within each of the one or more watering stations. As a cart 104 passes a watering station, a particular amount of water may be provided to the tray 106 supported by the cart 104 and/or individual cells within the tray 106 by the fluid distribution manifold, as described in greater detail herein. For example, seeds may be watered by the fluid distribution manifold to reduce buoyancy and then flooded. Additionally, water usage and consumption may be monitored at a watering station and data may be generated that corresponds to such water usage and consumption. As such, when the cart 104 reaches a subsequent watering station along the track 102 in the assembly line grow pod 100, the data may be utilized to determine an amount of water to be supplied to the tray 106 via the fluid distribution manifold at that time.

In addition, the watering component 107 is communicatively coupled to the control component 160 such that the control component 160 provides control signals to the watering component 107 and/or receives status signals from the watering component 107. As a result of this providing and receiving of signals, the control component 160 can effectively direct the watering component 107 to provide fluid to the one or more fluid distribution manifolds via one or more water lines 110 fluidly coupled to the watering component 107.

Also depicted in FIG. 1A are airflow lines 112, which may also be fluidly connected to one or more air pumps and/or one or more air valves (not shown in FIG. 1A). Specifically, the one or more air pumps may be pumps that are similar to pumps 150, but are coupled to the airflow lines 112 to deliver air to one or more portions of the assembly line grow pod 100. In addition, the one or more air valves may be valves that are similar to the flow control valves 180, but are coupled to the airflow lines 112 to direct airflow to one or more portions of the assembly line grow pod 100. The air may be delivered, for example, to control a temperature of the assembly line grow pod 100 or an area thereof, a pressure of the air in the assembly line grow pod 100 or an area thereof, control a concentration of carbon dioxide ($CO_2$) in the air of the assembly line grow pod 100 or an area thereof, control a concentration of oxygen in the air of the assembly line grow pod 100 or an area thereof, control a concentration of nitrogen in the air of the assembly line grow pod 100) or an area thereof, and/or the like.

Accordingly, the airflow lines 112 may distribute the airflow at particular areas in the assembly line grow pod 100 to facilitate control. As such, the airflow lines 112 may be fluidly coupled to a pump and/or a valve and may further be fluidly coupled between an air source and a target air delivery area. In addition, sensors may sense characteristics (e.g., a concentration, a pressure, a temperature, flow velocity, and/or the like) and may generate data and/or signals corresponding to the sensed characteristics, which may be used for further control.

Referring to FIG. 1B, additional components of the assembly line grow pod 100 are illustrated, including (but not limited to) one or more lighting devices 206, a harvester component 208, and a sanitizer component 210. As described above, the seeder component 108 may be configured to seed the trays 106 of the carts 104. While also referring to FIG. 1A, the lighting devices 206 may provide light waves that may facilitate plant growth at various locations throughout the assembly line grow pod 100 as the carts 104 traverse the track 102. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are lighted, watered, and provided nutrients, the carts 104 traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester component 208, modifications to a recipe may be made for that particular cart 104 until the cart 104 reaches the harvester component 208. Conversely, if a cart 104 reaches the harvester component 208 and it has been determined that the plants in the cart 104 are not ready for harvesting, the assembly line grow pod 100 may commission the cart 104 for another lap. This additional lap may include a different dosing of light, water, nutrients, etc. and the speed of the cart 104 could change, based on the development of the plants on the cart 104. If it is determined that the plants on a cart 104 are ready for harvesting, the harvester component 208 may harvest the plants from the trays 106.

Referring to FIG. 1B, the harvester component 208 may cut the plants at a particular height for harvesting in some embodiments. In some embodiments, the tray 106 may be overturned to remove the plants from the tray 106 and into a processing container for chopping, mashing, juicing, and/or the like. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray 106 are clear of plant material, the sanitizer component 210 may remove any particulate matter, plant material, and/or the like that may remain on the cart 104. As such, the sanitizer component 210 may implement any of a plurality of different washing mechanisms, such as high pressure water, high temperature water, and/or other solutions for cleaning the cart 104 and/or the tray 106. As such, the sanitizer component 210 may be fluidly coupled to one or more of the water lines 110 to receive water that is pumped via the one or more pumps 150 and directed via the one or more flow control valves 180 (FIG. 1A) through the water lines 110.

Still referring to FIG. 1B, the tray 106 may be overturned to output the plant for processing and the tray 106 may remain in this position in some embodiments. As such, the sanitizer component 210 may receive the tray 106 in this position, which may wash the cart 104 and/or the tray 106 and return the tray 106 back to the growing position. Once the cart 104 and/or tray 106 are cleaned, the tray 106 may again pass the seeder component 108, which may determine that the tray 106 requires seeding and may begin the process placing seeds in the tray 106, as described herein.

It should be understood that the assembly line grow pod 100 may include additional components not specifically described herein, and the present disclosure is not limited solely to the components described herein. Illustrative additional components may include, but are not limited to, other watering components, other lighting components, other airflow components, growth monitoring components, other harvesting components, other washing and/or sanitizing components, and/or the like.

Figure 2:
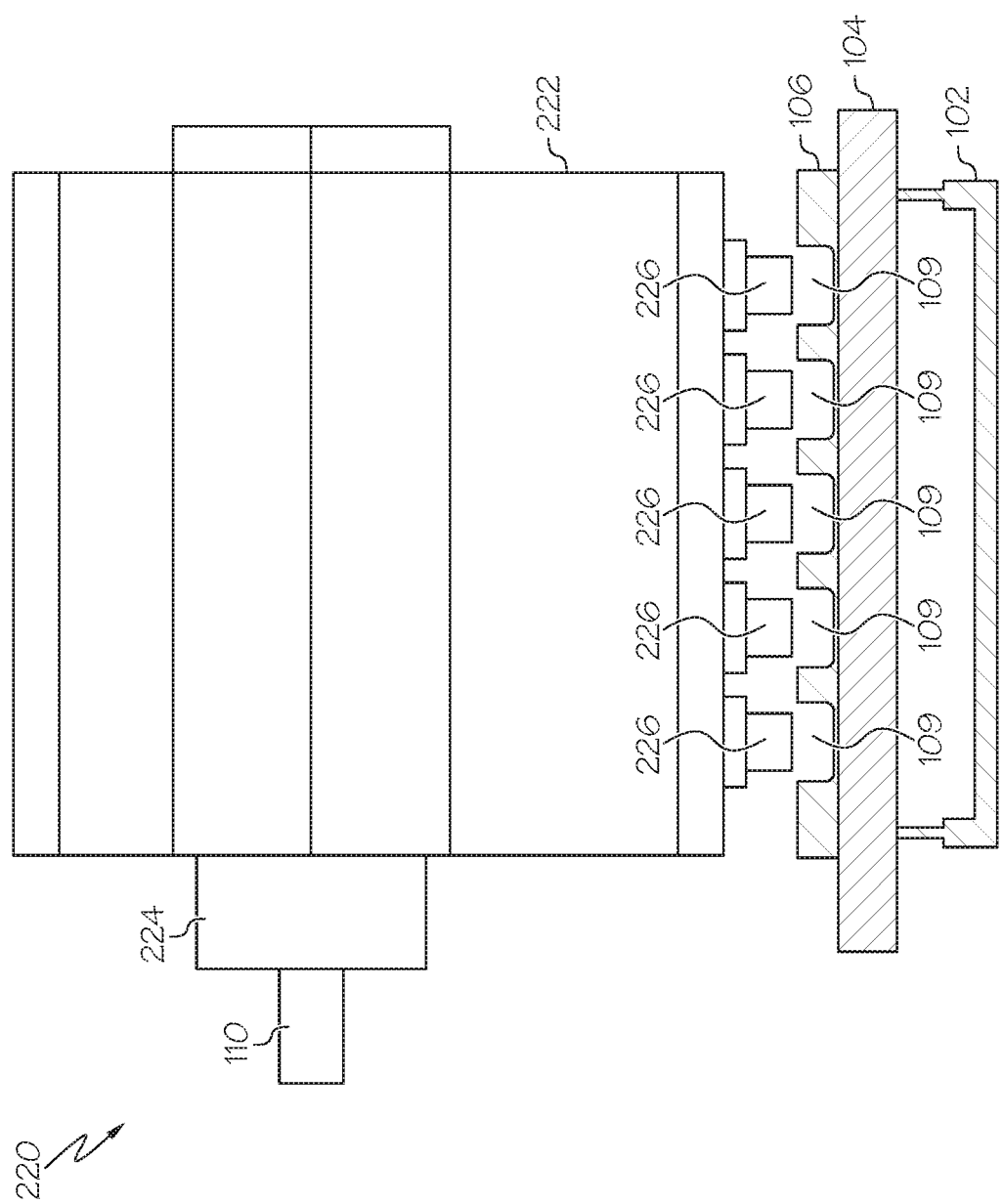
FIG. 2 schematically depicts a side view of an illustrative fluid distribution manifold aligned with a plurality of cells in a tray supported on a track within an assembly line grow pod according to one or more embodiments shown and described herein.

Referring now to FIG. 2, the arrangement of a fluid distribution manifold 220 relative to the one or more trays 106 held by a cart 104 and supported on the track 102 when the cart 104 is positioned adjacent to the fluid distribution manifold 220 is shown. More specifically, FIG. 2 schematically depicts a side view of an illustrative fluid distribution manifold 220 aligned with a plurality of cells 109 in the tray 106 on the cart 104 supported on the track 102 within the assembly line grow pod 100 (FIG. 1A). However, it should be understood that the fluid distribution manifold 220 may also be arranged above a tray 106 having a single cell or space for holding seeds, as described hereinabove.

The fluid distribution manifold 220 depicted in FIG. 2 functions as a portion of the water distribution component to supply fluid (e.g., water, nutrients, etc.) to the cells 109 within the tray 106 supported by the cart 104 on the track 102. The fluid distribution manifold 220 may generally be located at any location within the assembly line grow pod 100 (FIG. 1A), but may be particularly located adjacent to the track 102, as described in greater detail herein.

In some embodiments, the fluid distribution manifold 220 may be fixed in a particular location or position relative to the track 102. That is, the fluid distribution manifold 220 may not move relative to the track 102. Rather, the cart 104 may move each tray 106 along the track 102 within the vicinity of the fluid distribution manifold 220. In other embodiments, the fluid distribution manifold 220 may be movable such that the location or positioning of the fluid distribution manifold 220 can be changed. For example, the fluid distribution manifold 220 may be movable such that it can traverse an entire length of a tray 106, traverse a portion of the track 102, and/or the like.

As shown in FIG. 2, the fluid distribution manifold 220 includes a body 222 having a fluid inlet 224 and a plurality of fluid outlets 226. As disclosed hereinbelow, the fluid inlet 224 is generally fluidly coupled to the plurality of fluid outlets 226 such that fluid received via the fluid inlet 224 is ejected via the fluid outlets 226. Accordingly, the fluid inlet 224 may be fluidly coupled to one or more of the water lines 110 of the assembly line grow pod 100 (FIG. 1A) to receive fluid. In addition, the fluid outlets 226 may be aligned such that fluid ejected therefrom is placed in an intended location, such as the cells 109 of the tray 106. As such, in the embodiment depicted in FIG. 2, the fluid outlets 226 may be aligned with the track 102 such that when the cart 104 passes underneath the fluid distribution manifold 220, the fluid outlets 226 are aligned with the cells 109 of the tray 106.

As a result of the configuration of the fluid distribution manifold 220, the fluid that is received from the one or more water lines 110 via the fluid inlet 224 may subsequently be distributed out of the fluid distribution manifold 220 through the one or more fluid outlets 226, as described in more detail herein.

It should be understood that while FIG. 2 depicts five fluid outlets 226, the present disclosure is not limited to such. That is, the fluid distribution manifold 220 may have fewer than or greater than five fluid outlets 226. In some embodiments, the number of fluid outlets 226 in the fluid distribution manifold 220 may correspond to a number of cells 109 in a particular section of the tray 106 such that a single fluid outlet 226 deposits a precise amount of fluid into a corresponding one of the cells 109 or a group of cells 109 in the tray 106.

In some embodiments, the number of fluid outlets 226 may correspond to the number of cells 109 or the number of cell groups that exists across a length of the tray 106. For example, if the tray 106 contains five cells 109 or five cell groups across the length thereof, the fluid distribution manifold 220 may correspondingly contain five fluid outlets 226. In addition, the tray 106 may contain successive rows of cells 109 or groups of cells. Accordingly, as the cart 104 moves the tray 106 along the track 102, the fluid outlets 226 may successively deposit a specific amount of fluid in each successive row as the rows pass under the fluid outlets 226.

The positioning of the various fluid outlets 226 with respect to one another is not limited by this disclosure, and may be positioned in any configuration. In some embodiments, the fluid outlets 226 may be positioned in a substantially straight line. In other embodiments, the fluid outlets 226 may be positioned such that they are staggered in a particular pattern. In yet other embodiments, the fluid outlets 226 may be arranged in a grid pattern. In yet other embodiments, the fluid outlets 226 may be arranged in a honeycomb pattern.

The fluid distribution manifold 220 may further be positioned such that the specific amount of fluid that is ejected from the fluid distribution manifold 220 via the one or more fluid outlets 226 is deposited into a corresponding one or more of the cells 109 within the tray 106. In some embodiments, each fluid outlet 226 on the fluid distribution manifold 220 may provide fluid to a corresponding single cell 109 within a row of cells in the tray 106. In other embodiments, each fluid outlet 226 on the fluid distribution manifold 220 may provide a specific amount of fluid to a corresponding group of cells 109 within the tray 106. For example, a particular fluid outlet 226 may be configured to provide fluid to a group of cells 109 that are clustered together such that the precise amount of fluid ejected from the fluid outlet 226 is received by each cell 109 in the group of cells 109.

In some embodiments, the fluid distribution manifold 220 may be communicatively coupled to a sensing device, such as a cell sensor or the like, that detects an amount of fluid received by a cell 109 as a result of dispensing the precise amount of fluid from the fluid distribution manifold 220. As such, if the precise amount of fluid is not appropriately dispensed from the fluid distribution manifold 220 (e.g., due to misalignment, leaks, etc.), the sensing device will detect the incorrect amount of fluid within the cell 109 and transmit a signal such that corrective action can be taken. For example, if less than the precise amount of fluid is detected, the sensing device may transmit a signal accordingly, which is then used to determine how much additional fluid is needed within the cell 109 and adjust the settings of the fluid distribution manifold 220 to ensure the additional amount of fluid is delivered to the cell. Additional details regarding adjusting the settings of the fluid distribution manifold is described in greater detail herein.

While only a single fluid distribution manifold 220 is depicted in FIG. 2, it should be understood that the assembly line grow pod 100 (FIG. 1A) may include a plurality of fluid distribution manifolds 220 distributed at various locations throughout. In some embodiments, a fluid distribution manifold 220 may be positioned at any location within the assembly line grow pod 100 (FIG. 1A) where it may be desired to provide the precise amount of fluid (e.g., water and/or nutrients) to the trays 106 as they are moved on the track 102 by the cart 104. For example, a fluid distribution manifold 220 may be placed adjacent to the track 102 at a location designated as a watering station within the assembly line grow pod 100 (FIG. 1A). As a result of this configuration, the fluid distribution manifold 220 can be utilized to provide a precise amount of fluid to each of the cells 109 in the tray 106 to ensure an exact supply of water and/or nutrients to each of the seeds, shoots, plants, etc. within the assembly line grow pod 100 (FIG. 1A).

Figure 3A:
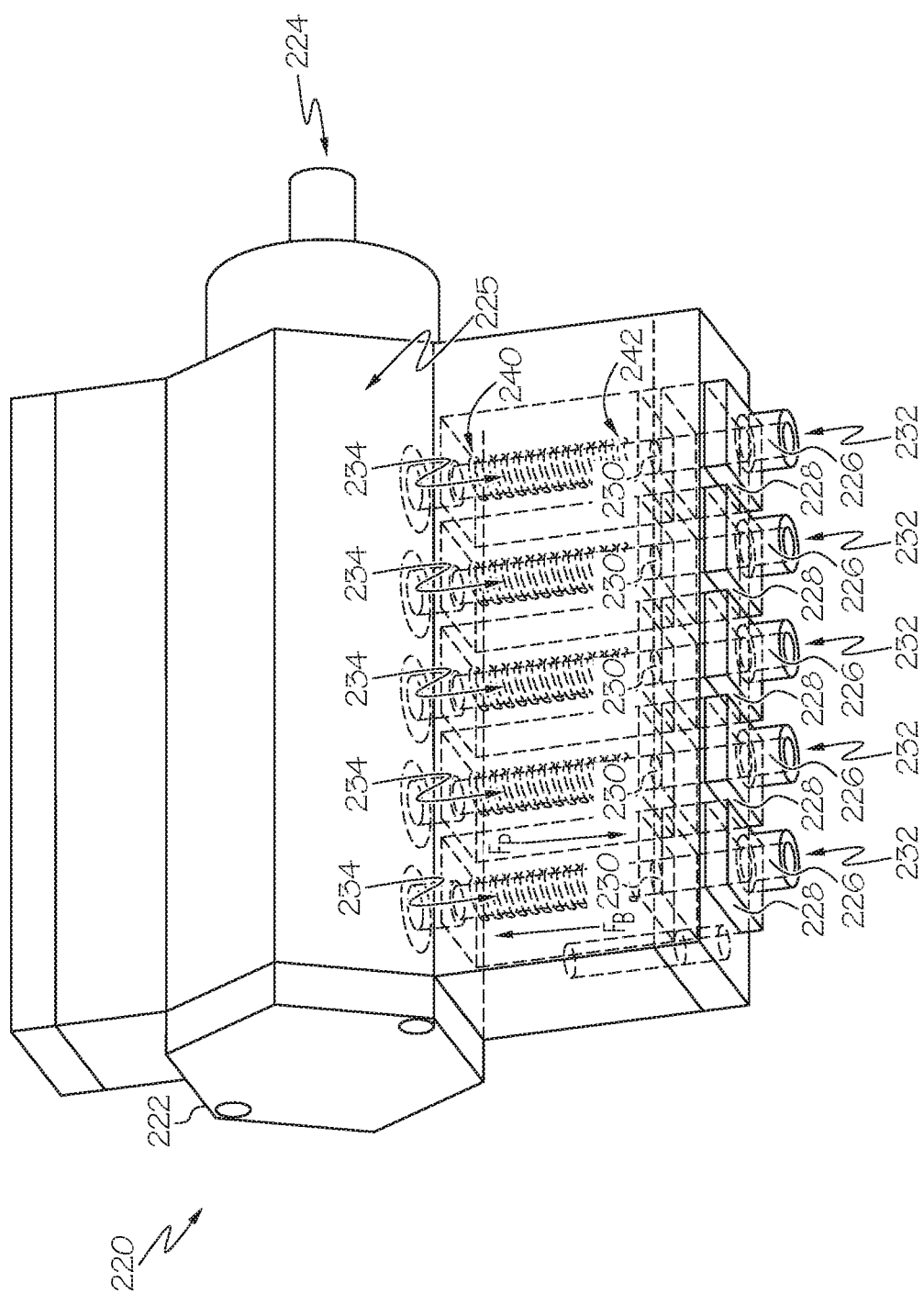
FIG. 3A schematically depicts a perspective side view of illustrative internal components of a fluid distribution manifold according to one or more embodiments shown and described herein.
Figure 3B:
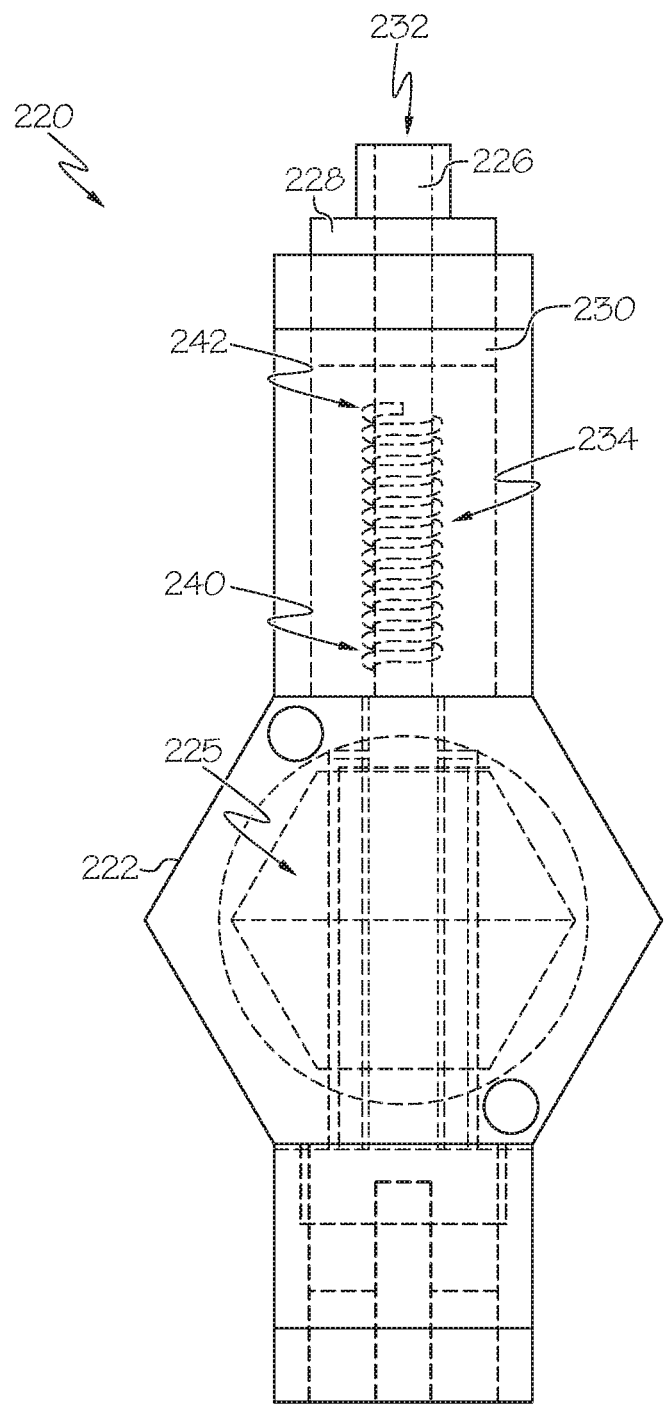
FIG. 3B schematically depicts a top view of illustrative internal components of a fluid distribution manifold according to one or more embodiments shown and described herein.
Figure 3C:
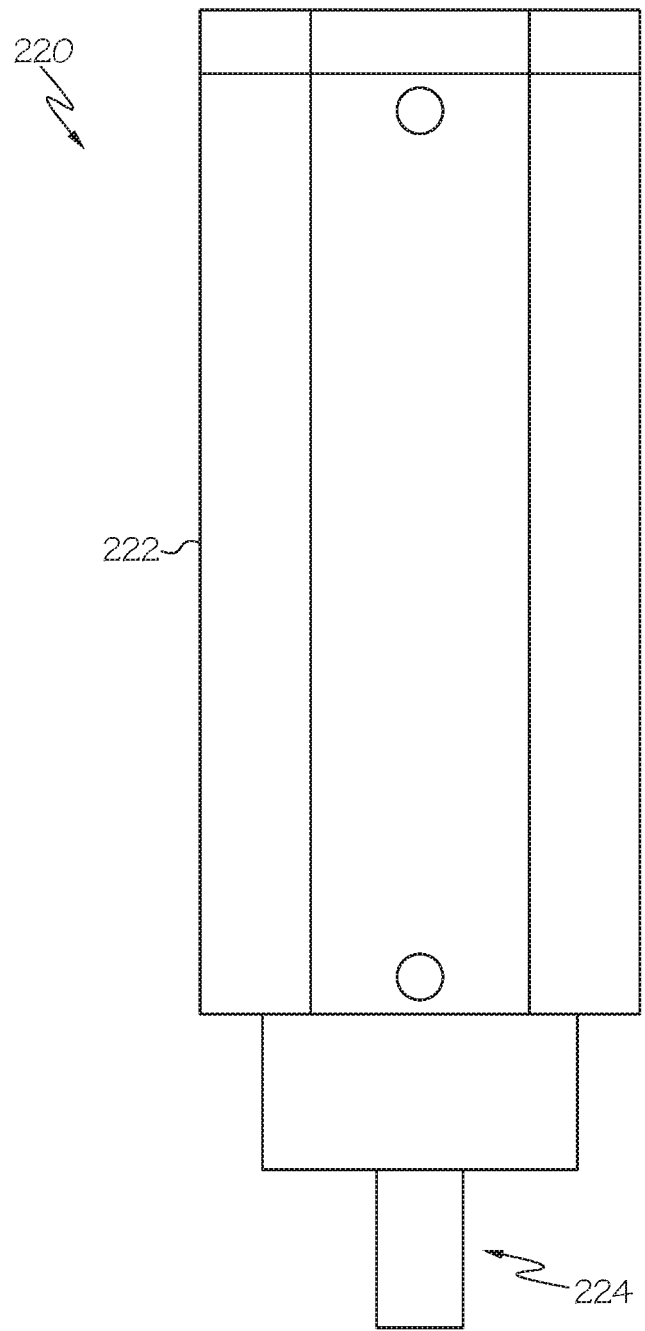
FIG. 3C schematically depicts a rear view of an illustrative fluid distribution manifold according to one or more embodiments shown and described herein.

Referring now to FIGS. 3A-3C, additional details regarding the fluid distribution manifold 220 are depicted. More specifically, FIG. 3A schematically depicts a perspective side view of illustrative internal components of the fluid distribution manifold 220, FIG. 3B schematically depicts a top view of the illustrative internal components of the fluid distribution manifold 220, and FIG. 3C depicts a rear view of the fluid distribution manifold 220. As shown in FIG. 3A-3C, the body 222 of the fluid distribution manifold defines a cavity 225 that fluidly couples the fluid inlet 224 to the fluid outlets 226. Accordingly, the cavity 225 is fluidly connected to the fluid inlet 224 such that fluid received from the one or more water lines 110 (FIG. 1A) is received within the cavity 125.

As particularly shown in FIGS. 3A and 3B, within the cavity 225 of the body 222 of the fluid distribution manifold 220 are one or more biasing assemblies 234. The one or more biasing assemblies 234 are coupled to one or more corresponding valves 230 within the cavity 125. The valve 230 with the corresponding biasing assembly 234 may be a check valve in some embodiments. Each of the one or more valves 230 may be coupled within a corresponding fluid outlet 226 such that the valves 230 selectively control movement of the fluid from the cavity 225 out of the fluid outlet 226 via an opening 232 in the fluid outlet 226. That is, when each valve 230 is in an open position, fluid from the cavity 225 can flow past the valve 230 out of the opening 232 in the fluid outlet 226. In addition, when each valve 230 is in a closed position, fluid from the cavity 225 remains in the cavity 225 and does not flow past the valve 230 and out of the fluid outlet 226 via the opening 232 therein.

In various embodiments, each of the one or more valves 230 may be coupled to a corresponding biasing assembly 234, which may bias the valve 230 in a particular direction. For example, the biasing assembly 234 may bias the valve 230 coupled thereto towards a proximal direction 240 (e.g., away from the fluid outlet 226), or may bias the valve 230 coupled thereto towards a distal direction 242 (e.g., towards the fluid outlet 226). In some embodiments, the biasing assembly 234 may bias the valve 230 towards the closed position. That is, the biasing assembly 234, which may be a spring or the like, may provide a biasing force $F_B$ on the corresponding valve 230 to hold the valve 230 in the closed position, as particularly shown in FIG. 3A. While the biasing force $F_B$ is depicted in FIG. 3A as being towards the proximal direction 240 to close the valve 230, it should be understood that this is merely illustrative. That is, the valve 230 may be placed in the closed position via a biasing force that is towards the distal direction 242 in some embodiments. In addition, while the biasing assembly 234 depicted in FIG. 3A is a spring, alternative devices (e.g., other biasing assemblies, devices, mechanisms, systems, or the like) that can provide a biasing force for the purposes of opening or closing the valve 230 may also be used without departing from the scope of the present disclosure. Examples of alternative devices should generally be understood.

Still referring to FIG. 3A and also with reference to FIG. 3B, the amount of force provided by the biasing force $F_B$ on the valve 230 can be adjusted via a tension ring 228. That is, the tension ring 228 can be turned or otherwise manipulated to increase or decrease the amount of force exerted by the biasing assembly 234 on the valve 230, which further increases or decreases the amount of force necessary to overcome the biasing force $F_B$ to open the valve 230. In some embodiments, the tension ring 228 may be mechanically coupled to an actuator or the like (not shown) that receives signals and adjusts the tension ring 228 according to the received signals. In some embodiments, the combination of the tension ring 228 with the biasing assembly 234 and the valve 230 may be referred to as a tunable check valve.

Adjustment of the amount of force exerted by the biasing assembly 234 may be completed to control when and precisely how much fluid is allowed to pass the valve 230 and out of the fluid outlet 226, as described in greater detail herein. It should be understood that each biasing assembly 234 may have a corresponding tension ring 228 such that each biasing assembly 234 can be independently adjusted for the amount of biasing force $F_B$ exerted on the valve 230. That is, a first biasing assembly 234 may be adjusted such that its corresponding first biasing force $F_B$ is greater than a second biasing force $F_B$ provided by a second biasing assembly 234. As will be apparent, adjusting the amount of biasing force $F_B$ that is exerted by the biasing assembly 234 ensures that only a particular fluid pressure causes the force to be overcome to open the valve 230. As such, by precisely controlling the fluid pressure within the cavity 225 and precisely controlling the biasing force $F_B$ provided by the biasing assembly 234 via the tension ring 228, only a precise amount of fluid may be allowed to pass the valve 230 when in an open position at a time, thereby reducing or eliminating instances where a cell 109 (FIG. 2) is provided with too much or too little fluid. That is, control of the components of the fluid distribution manifold 220 avoids an instance where the distribution of excessive residual fluid that might be present in other devices that are typically used to provide fluid. This provision of a precise amount of fluid to each of the cells 109 (FIG. 2) allows for a more effective and/or efficient growing of crops.

Still referring generally to FIGS. 3A-3B, fluid pressure in the cavity 225 increases a pressure force $F_P$ on the valve 230 that is in a direction opposite of the biasing force $F_B$. For example, in the embodiment depicted in FIG. 3A, the pressure force $F_P$ may be generally in the distal direction 242. When the fluid pressure reaches a particular threshold, the pressure force $F_P$ on the valve 230 may be greater than the biasing force $F_B$ exerted by the biasing assembly 234, thereby forcing the valve 230 to the open position. Since each biasing assembly 234 can be independently adjusted to increase or decrease the biasing force $F_B$ it exerts on the corresponding valve 230, it should be understood that a particular pressure causing a particular pressure force $F_P$ may result in overcoming the biasing force $F_S$ of certain biasing assemblies 234, but not others. This may allow for each of the valves 230 to be opened independently of one another based on the amount of fluid pressure within the cavity 225, thereby allowing a particular cell 109 (FIG. 2) to be supplied with fluid, but not another cell 109, ensuring that specific amounts of fluid are supplied to particular cells 109 by adjusting the fluid pressure within the cavity 225, and/or the like.

Still referring to FIGS. 3A-3B, in operation, fluid is pumped into the cavity 225 to fill the cavity 225 and to increase the fluid pressure within the cavity 225. The fluid pressure may generally be increased until the pressure force $F_P$ causes one or more of the valves 230 to open and allow fluid to pass therethrough and out of the fluid outlet 226, and subsequently deposited on the tray 106 (FIG. 2) and/or the one or more cells 109 therein. Fluid flow past a valve 230 can cease by decreasing the fluid pressure within the cavity 225 until the biasing force $F_B$ causes the valve 230 to close. Such a decreasing may occur when the rate of fluid flow that is pumped into the cavity 225 (e.g., via the fluid inlet 224) is less than the rate of fluid flow that is ejected out of the cavity 225 (e.g., via one or more of the fluid outlets 226). By maintaining a particular fluid pressure within the cavity 225 for a particular period of time and precisely adjusting the tension rings 228 to adjust the biasing force $F_B$, it is possible to precisely control the amount of fluid that is ejected from the cavity 225, thereby ensuring that the tray 106 (FIG. 2) and/or one or more cells 109 therein receive only a specific amount of fluid to ensure that the seeds, shoots, plants, or the like therein are appropriately supplied the exact amount of fluid (e.g., water and/or nutrients) to optimize growth and to avoid waste. Accordingly, operation of such a fluid distribution manifold 220 may be advantageous over fluid distribution systems that utilize other valve openings because the fluid distribution manifold 220 is capable of ejecting a precise amount of fluid through the fluid outlets 226 without causing excess fluid to remain within certain portions thereof, which could potentially drip into the tray 106 (FIG. 2) and/or the one or more cells 109 therein, thereby causing overwatering and/or delivery of excess nutrients to the seeds or plants located therein.

Figure 4:
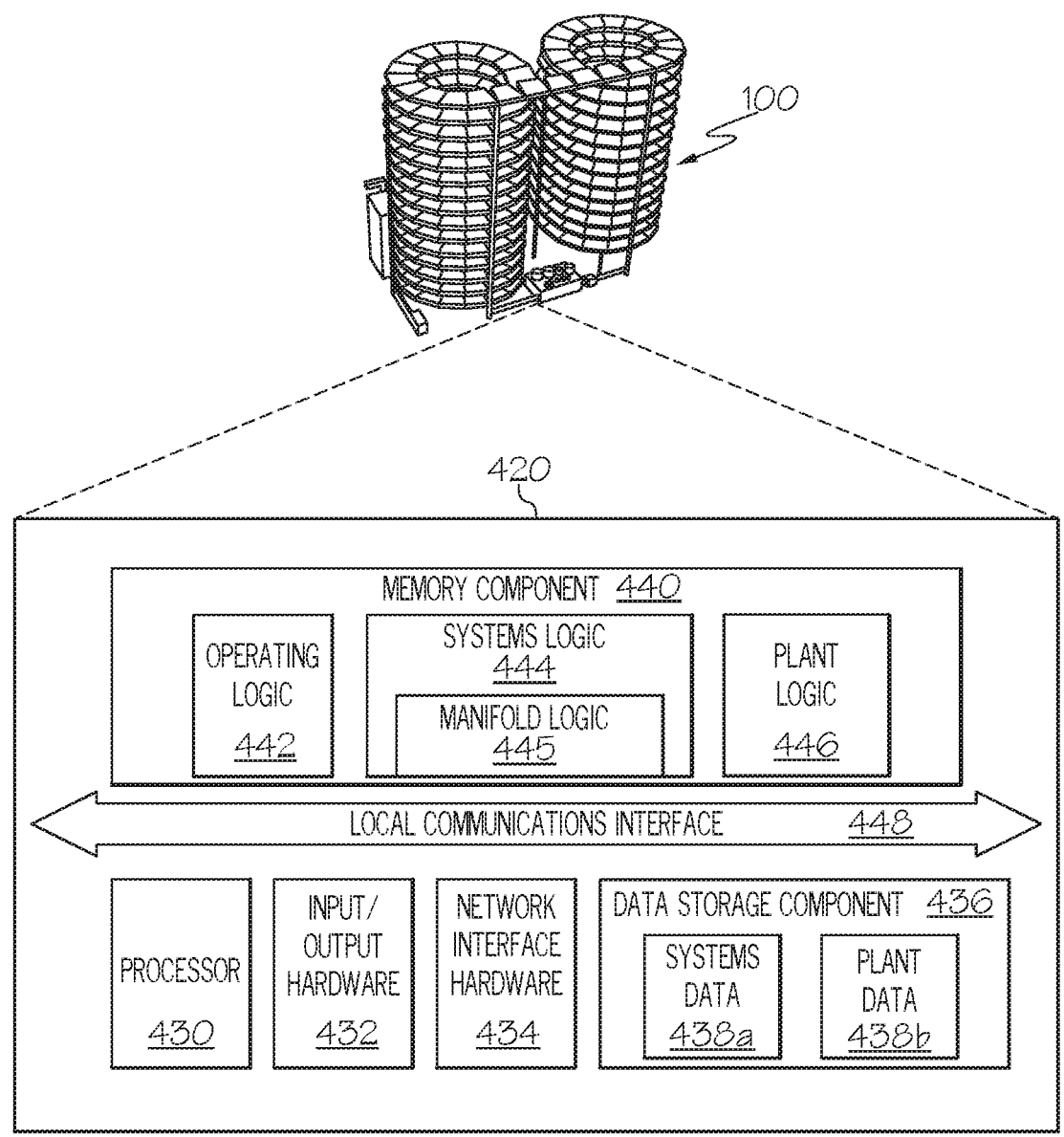
FIG. 4 depicts an illustrative computing environment within a control component of an assembly line grow pod having a fluid distribution manifold according to one or more embodiments shown and described herein.

Referring now to FIG. 4, an illustrative computing environment within the control component of the assembly line grow pod 100 having a fluid distribution manifold is depicted. The computing environment may be within any location of the assembly line grow pod 100 is not limited in location by the present disclosure. For example, the computing environment may be contained within a master controller, a control module inserted into the master controller, and/or the like. In another example, the computing environment may be contained within a portion of the fluid distribution manifold 220 (FIGS. 3A-3C). Control of the various components of the fluid distribution manifold 220 (FIGS. 3A-3C), including, for example, controlling the amount of water provided to the cavity 225 by way of the fluid inlet 224 (and thus the amount of water pressure within the cavity 225), the amount of tension provided to each biasing assembly 234 by way of the tension ring 228, and/or the like may be completed, for example, by using a computing environment.

Still referring to FIG. 4, the assembly line grow pod 100 (or a component thereof) may include a computing device 420. The computing device 420 includes a memory component 440, a processor 430, input/output hardware 432, network interface hardware 434, and a data storage component 436 (which stores systems data 438a, plant data 438b, and/or other data).

At least a portion of the components of the computing device 420 may be communicatively coupled to a local communications interface 448. The local communications interface 448 is generally not limited by the present disclosure and may be implemented as a bus or other communications interface to facilitate communication among the components of the flow control valve 180 coupled thereto.

The memory component 440 may be configured as volatile and/or nonvolatile memory. As such, the memory component 440 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the assembly line grow pod 100 (or portion thereof) or external to the assembly line grow pod 100 (or portion thereof). The memory component 440 may store, for example, operating logic 442, systems logic 444 (which may incorporate manifold logic 445), plant logic 446, and/or other logic. The operating logic 442, the systems logic 444, the manifold logic 445, and the plant logic 446 may each include a plurality of different pieces of logic, at least a portion of which may be embodied as a computer program, firmware, and/or hardware, as an example.

The operating logic 442 may include an operating system and/or other software for managing components of the assembly line grow pod 100. As described in more detail below, the systems logic 444 may monitor and control operations of one or more particular components of the assembly line grow pod, such as one or more valves, pumps, and/or the like. A portion of the systems logic 444 may be the manifold logic 445, which monitor and control operation of the fluid distribution manifold 220 (FIGS. 3A-3C), such as particular adjustment settings of the tension rings 228, control of a pressure and/or flow rate of fluid entering the fluid distribution manifold 220, and/or the like. Still referring to FIG. 4, the plant logic 446 may be configured to determine and/or receive a recipe for plant growth and may facilitate implementation of the recipe via the systems logic 444 and/or the manifold logic 445. It should be understood that while the various logic modules are depicted in FIG. 4 as being located within the memory component 440, this is merely an example. For example, the operating logic 442, the systems logic 444, the manifold logic 445, and/or the plant logic 446 may reside on different computing devices. That is, one or more of the functionalities and/or components described herein may be provided by a user computing device, a remote computing device, and/or another control module that is communicatively coupled to the assembly line grow pod 100 (or component thereof).

Additionally, while the computing device 420 is illustrated with the operating logic 442, the systems logic 444, the manifold logic 445, and the plant logic 446, this is also an example. In some embodiments, a single piece of logic (and/or or several linked modules) may cause the computing device 420 to provide the described functionality.

The processor 430 (which may also be referred to as a processing device) may include any processing component operable to receive and execute instructions (such as from the data storage component 436 and/or the memory component 440). Illustrative examples of the processor 430 include, but are not limited to, a computer processing unit (CPU), a many integrated core (MIC) processing device, an accelerated processing unit (APU), and a digital signal processor (DSP). In some embodiments, the processor 430 may be a plurality of components that function together to provide processing capabilities, such as integrated circuits (IC) (including field programmable gate arrays (FPGA), application-specific integrated circuits (ASIC)) and the like.

The input/output hardware 432 may include and/or be configured to interface with microphones, speakers, a display, and/or other hardware. That is, the input/output hardware 432 may interface with hardware that provides a user interface or the like. For example, a user interface may be provided to a user for the purposes of adjusting settings (e.g., an amount of nutrients/water to be supplied, etc.), viewing a status (e.g., receiving a notification of an error, a status of a particular valve or other component within the fluid delivery manifold, etc.), and/or the like.

The network interface hardware 434 may include and/or be configured for communicating with any wired or wireless networking hardware, including an antenna, a modem, LAN port, wireless fidelity (Wi-Fi) card, WiMax card, ZigBee card, Z-Wave card, Bluetooth chip, USB card, mobile communications hardware, and/or other hardware for communicating with other networks and/or devices. From this connection, communication may be facilitated between the various components of the assembly line grow pod 100, such as, for example, communication between control modules, the seeder component, the harvesting component, the watering component, the one or more pumps, one or more valves, the fluid distribution manifold, and/or the like. In some embodiments, the network interface hardware 434 may also facilitate communication between the assembly line grow pod 100 and components external to the assembly line grow pod 100, such as, for example, user computing devices and/or remote computing devices.

Still referring to FIG. 4, the assembly line grow pod 100 may be coupled to a network via the network interface hardware 434. Various other control modules, other computing devices, and/or the like may also be coupled to the network, as described in greater detail herein. Illustrative other computing devices include, for example, a user computing device and a remote computing device. The user computing device may include a personal computer, laptop, mobile device, tablet, server, etc. and may be utilized as an interface with a user. As an example, a user may send a recipe to the computing device 420 for at least a partial implementation by the assembly line grow pod 100 or a component thereof. Another example may include the assembly line grow pod (and/or one or more components thereof) sending notifications to a user of the user computing device.

Similarly, the remote computing device may include a server, personal computer, tablet, mobile device, etc. and may be utilized for machine to machine communications. As an example, if the assembly line grow pod 100 determines a type of seed being used (and/or other information, such as ambient conditions), the computing device 420 may communicate with the remote computing device to retrieve a previously stored recipe for those conditions. As such, some embodiments may utilize an application program interface (API) to facilitate this or other computer-to-computer communications.

Still referring to FIG. 4, the data storage component 436 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 436 may reside local to and/or remote from the assembly line grow pod 100 (or component thereof) and may be configured to store one or more pieces of data and selectively provide access to the one or more pieces of data. As illustrated in FIG. 4, the data storage component 436 may store systems data 438a, plant data 438b, and/or other data. The systems data 438a may generally include data relating to the functionality of the assembly line grow pod 100 and/or one or more components thereof (e.g., the fluid distribution manifold), such as stored settings, information regarding the location of components within the assembly line grow pod, functionality of various components within the assembly line grow pod 100, and/or the like. The plant data 438b may generally relate to recipes for plant growth, settings of various components within the assembly line grow pod 100, data relating to control of the assembly line grow pod 100 (and/or a component thereof), sensor data relating to a particular tray or cart, and/or the like.

It should be understood that while the components in FIG. 4 are illustrated as residing within the assembly line grow pod 100, this is merely an example. In some embodiments, one or more of the components may reside external to the assembly line grow pod, such as within a user computer, a control server, and/or the like. It should also be understood that, while the computing device 420 is illustrated as a single device, this is also merely an example. That is, the computing device 420 may be a plurality of devices that are communicatively coupled to one another and provide the functionality described herein.

Figure 5:
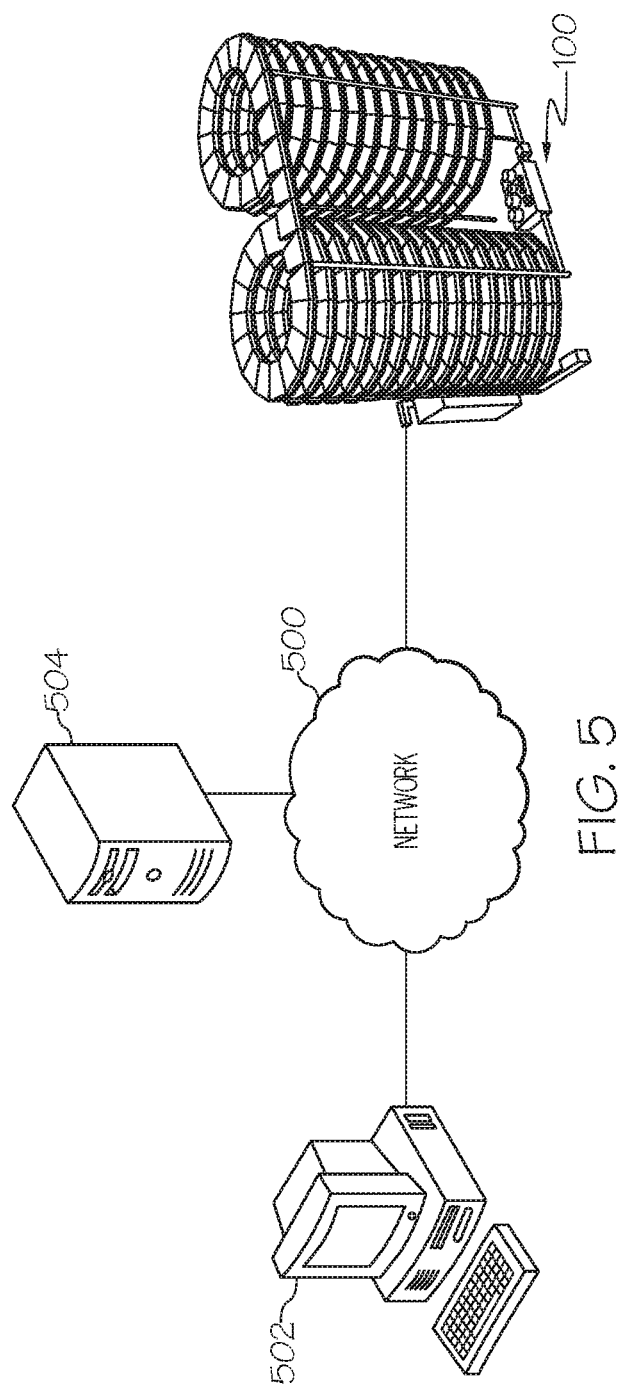
FIG. 5 depicts an illustrative computer network for controlling an assembly line grow pod having a fluid distribution manifold according to one or more embodiments shown and described herein.

Additionally, as depicted in FIG. 5, the assembly line grow pod 100 is coupled to a network 500. The network 500 may include the internet or other wide area network, a local network, such as a local area network, a near field network, such as Bluetooth or a near field communication (NFC) network. The network 500 is also coupled to a user computing device 502 and/or a remote computing device 504. The user computing device 502 may include a personal computer, laptop, mobile device, tablet, server, etc. and may be utilized as an interface with a user. As an example, a user may send a recipe to the computing device for implementation by the assembly line grow pod 100, which may further include implementation by the fluid distribution manifold 220 (FIGS. 3A-3C). Another example may include the assembly line grow pod 100 (including the fluid distribution manifold) sending notifications to a user of the user computing device 502.

Still referring to FIG. 5, the remote computing device 504 may include a server, personal computer, tablet, mobile device, etc. and may be utilized for machine to machine communications. As an example, if the assembly line grow pod 100 determines a type of seed being used (and/or other information, such as ambient conditions), the computing device may communicate with the remote computing device 504 to retrieve a previously stored recipe for those conditions, which may include various fluid distribution manifold settings to ensure an appropriate amount of water and/or nutrients are delivered by the fluid distribution manifold. As such, some embodiments may utilize an application program interface (API) to facilitate this or other computer-to-computer communications.

Figure 6:
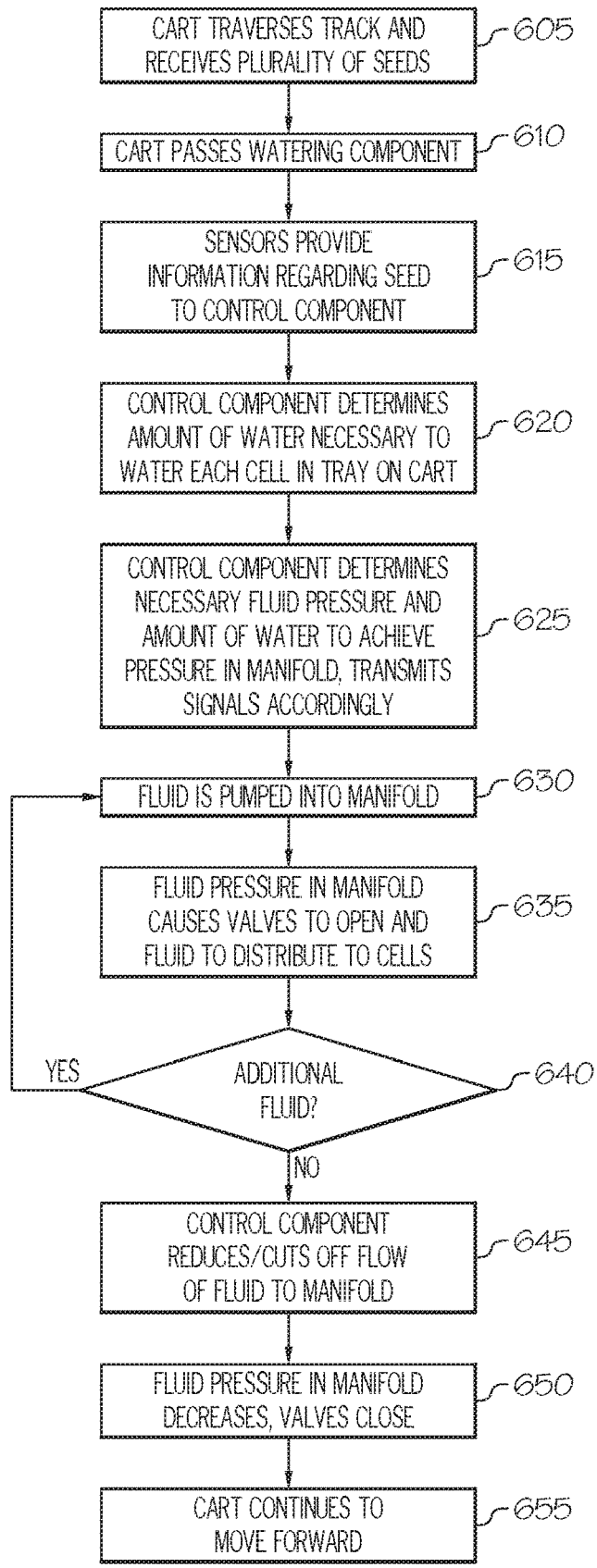
FIG. 6 depicts a flow diagram of an illustrative method of operating one or more fluid distribution manifolds in an assembly line grow pod according to one or more embodiments shown and described herein.

FIG. 6 depicts a flow diagram of an illustrative method of operating one or more fluid distribution manifolds in an assembly line grow pod, according to embodiments described herein. As illustrated at block 605, a powered cart traversing a rail receives a plurality of seeds for growth from a seeding component. For example, the seeding component may deposit one or more seeds within each cell of the tray supported on the cart, and/or the like.

At block 610, the cart passes a watering component for providing water to the plurality of seeds. That is, the cart traverses the track of the assembly line grow pod until the cart is adjacent to the watering component such that the fluid distribution manifold can be utilized to provide a specific amount of fluid (e.g., water and/or nutrients) to each cell in the tray and/or to the tray as a whole.

At block 615, the sensors provide information regarding the seeds to the control component so that the control component can determine the precise amount of fluid necessary to water and/or supply nutrients to the seeds (e.g., each cell in the tray on the cart) at block 620. For example, the sensors may provide information regarding an existing amount of fluid within a particular cell, the type of seed, shoot, plant, or the like present in the cell, and/or the like. This information is then used to determine how much fluid is necessary to be provided, which may be based on a recipe or the like that requires a very particular amount of fluid to be provided to each cell accordingly.

At block 625, the control component determines the necessary fluid pressure needed inside the fluid distribution manifold and the amount of water necessary to achieve the necessary fluid pressure inside the manifold that will result in fluid overcoming the biasing force of a particular one of the biasing assemblies to cause a valve to open and allow a very particular amount of fluid therethrough before closing. As such, the determination of the necessary fluid pressure and the amount of water accounts for the amount of biasing force that is being applied by each of the biasing assemblies and may further include directing a change in the amount of biasing force to ensure appropriate water delivery. That is, a tension ring setting necessary to ensure the correct biasing force may be determined as part of block 625, and a signal may be transmitted to an actuator or the like that controls movement of the tension rings accordingly to adjust the tension of the biasing assembly such that the tension rings correspond to the tension ring setting.

At block 630, fluid is pumped into the fluid distribution manifold and the fluid pressure in the fluid distribution manifold causes the valves to open and fluid to distribute to the cells at block 635. For example, one or more pumps that are fluidly coupled to the fluid inlet may receive a signal and may pump fluid accordingly (e.g., pump fluid at a particular/predetermined flow rate and/or pressure). The pumped fluid then enters the cavity of the fluid distribution manifold. As more fluid enters (and without any fluid exiting) the cavity, the pressure of the fluid increases. Once the pressure hits a particular threshold (as determined by the adjustment of the tension rings), the pressure exceeds the pressure exerted by the biasing assembly, which causes the valve to be pushed open by the fluid pressure and allowing fluid to be ejected. Since the ejection of fluid may cause the fluid pressure within the cavity to decrease (depending on whether fluid is still being pumped into the fluid distribution manifold, the rate of fluid flow in and out of the fluid distribution manifold, and/or the like), the valve may close once the fluid pressure falls below the threshold, thus causing the biasing force to move the valve to the closed position. It should be understood that precise control of the tension ring (to control the biasing force) in combination with precise control of the amount and rate of fluid pumped into the fluid distribution manifold can be manipulated such that a very particular amount of fluid enters each cell of the tray from the fluid distribution manifold, and avoids instances where excessive fluid is supplied, excess fluid drips out after valve closure, and/or the like.

To ensure this precise control, at block 640, a determination is made as to whether additional fluid is needed. That is, an amount of fluid that is pumped into the fluid distribution manifold and/or ejected from the fluid distribution manifold is carefully monitored to ensure only the precise amount of fluid is supplied. If additional fluid is needed, the process repeats at block 630, whereby additional control signals are sent to pumps, valves, actuators controlling the tension rings, and/or the like to adjust for additional fluid as necessary. If no additional fluid is needed, the process proceeds to block 645.

Still ensuring this precise control further includes reducing or cutting off the supply of fluid in the manifold at block 645. That is, one or more signals may be transmitted to one or more valves and/or pumps to cease or reduce the amount of fluid that is supplied to the fluid distribution manifold to ensure that the fluid pressure within the fluid distribution manifold decreases.

As a result, at block 650, the water exiting the manifold via the valves causes the fluid pressure within the manifold to drop, thereby causing the biasing assemblies to once again move the valves toward a closed position, thereby shutting off the supply of fluid to the cells. At block 655, the cart continues to move forward within the assembly line grow pod. The process with respect to FIG. 6 may then repeat accordingly for each successive group of cells, trays, and/or the like that passes adjacent to the fluid distribution manifold and requires precise fluid delivery.

As illustrated above, various embodiments for distributing a precise amount of fluid to each cell of a plurality of cells of a tray on a cart supported on a track in an assembly line grow pod are disclosed. As a result of the embodiments described herein, very specific control of fluid supplied to the various cells in a tray (or the tray alone) is achieved. This very specific control of fluid ensures that only a precise amount of fluid is supplied to a seed, shoot, plant, or the like at a particular time, thereby ensuring optimum growth of the seed, shoot, plant, or the like. In addition, the precise delivery of fluid via the fluid distribution manifold avoids underwatering and overwatering, as well as generation of waste water. Moreover, the precise delivery of fluid via the fluid distribution manifold reduces or eliminates dripping water being ejected into the cells and/or trays, which may impact the precise amount of fluid needed by particular seeds, shoots, plants, and/or the like.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing and operating a fluid distribution manifold in an assembly line grow pod to ensure the precise placement of fluid. It should also be understood that these embodiments are merely exemplary and are not intended to limit the scope of this disclosure.

What is claimed is:

1. An assembly line grow pod comprising:
   a fluid source; and
   a fluid distribution manifold comprising:
      a body defining a cavity, the body comprising:
         a fluid inlet fluidly coupled to the fluid source,
         a plurality of fluid outlets fluidly coupled to the fluid inlet,
      a plurality of valves, each one of the plurality of valves coupled within a fluid outlet of the plurality of fluid outlets and movable between an open position and a closed position,
      a plurality of biasing assemblies, each one of the plurality of biasing assemblies coupled to each one of the plurality of valves to bias each one of the plurality of valves in the closed position, and a plurality of tension rings, each one of the plurality of tension rings coupled to each one of the plurality of biasing assemblies to independently adjust an amount of biasing force applied by each one of the biasing assemblies, wherein fluid delivered from the fluid source results in a fluid pressure within the cavity of the fluid distribution manifold that exceeds the biasing force applied by at least one of the biasing assemblies causes the at least one of the plurality of valves to move to the open position for a particular amount of time such that a specific amount of the fluid is ejected from the at least one of the plurality of fluid outlets, the particular amount of time based on an amount of time necessary for the fluid pressure within the cavity to be reduced below the biasing force of at least one of the biasing assemblies.

2. The assembly line grow pod of claim 1, wherein the amount of biasing force applied by each one of the biasing assemblies is independently adjustable by each one of the tension rings such that the biasing force applied by each one of the biasing assemblies are different from one another.

3. The assembly line grow pod of claim 1, wherein the amount of biasing force applied by the at least one of the biasing assemblies is adjustable by each one of the tension rings such that the biasing force applied by each one of the biasing assemblies is the same.

4. The assembly line grow pod of claim 1, further comprising:
a track;
a cart supported on the track and movable along a length of the track; and
a tray supported on the cart, the tray comprising one or more cells that hold seeds, shoots, or plants.

5. The assembly line grow pod of claim 4, wherein the fluid distribution manifold is positioned adjacent to the track such that, when the cart, when moving along the length of the track, passes the fluid distribution manifold, the one or more cells of the tray are aligned with the plurality of fluid outlets such that the specific amount of the fluid is ejected into the one or more cells based on a predetermined amount of fluid needed for plant material contained in each of the one or more cells.

6. The assembly line grow pod of claim 1, further comprising a fluid line fluidly coupled between the fluid source and the fluid inlet of the fluid distribution manifold.

7. The assembly line grow pod of claim 1, further comprising one or more flow control valves fluidly coupled between the fluid source and the fluid inlet of the fluid distribution manifold, the one or more flow control valves controlling a flow of fluid from the fluid source and the fluid inlet.

8. The assembly line grow pod of claim 1, further comprising one or more pumps fluidly coupled between the fluid source and the fluid inlet of the fluid distribution manifold, the one or more pumps controlling a pressure and a flow of the fluid from the fluid source to the fluid inlet.

9. The assembly line grow pod of claim 8, further comprising a control component communicatively coupled to the one or more pumps and the plurality of tension rings, the control component transmitting signals to the one or more pumps and the plurality of tension rings to control the pressure and flow of fluid into the fluid distribution manifold and the specific amount of the fluid that is ejected from each one of the plurality of fluid outlets.

10. The assembly line grow pod of claim 1, wherein the fluid source is a fluid holding tank containing one or more of the following: water, a mixture of water and nutrients, or nutrients.

11. The assembly line grow pod of claim 1, wherein the fluid source is a watering component that supplies one or more of the following: water and nutrients to plants that are grown in the assembly line grow pod.

12. The assembly line grow pod of claim 1, wherein the specific amount of the fluid that is ejected from each one of the plurality of fluid outlets is predetermined according to a fluid supply recipe.

13. The assembly line grow pod of claim 1, further comprising a computing device configured to:
control an amount of fluid provided to the cavity via the fluid inlet; and
independently adjust a tension of at least one of the plurality of the plurality of tension rings.

14. The assembly line grow pod of claim 1, wherein the computing device controls the amount of fluid provided to the cavity via the fluid inlet and independently adjusts the tension of at least one of the plurality of tension rings to provide the specific amount of fluid to one or more cells within a tray containing plant material.

15. A water distribution manifold in an assembly line grow pod, the water distribution manifold comprising:
a body defining a cavity;
a fluid inlet fluidly coupled to the cavity, the fluid inlet receiving fluid from a fluid source;
a plurality of fluid outlets fluidly coupled to the cavity;
a plurality of valves, each one of the plurality of valves coupled within a fluid outlet of the plurality of fluid outlets and movable between an open position and a closed position;
a plurality of biasing assemblies, each one of the plurality of biasing assemblies coupled to each one of the plurality of valves to bias each one of the plurality of valves in the closed position; and
a plurality of tension rings, each one of the plurality of tension rings coupled to each one of the plurality of biasing assemblies to independently adjust an amount of biasing force applied by each one of the biasing assemblies,
wherein fluid that is received via the fluid inlet results in a fluid pressure within the cavity that exceeds the biasing force applied by at least one of the biasing assemblies, which causes each one of the plurality of valves to move to the open position for a particular amount of time such that a specific amount of the fluid is ejected from the at least one of the plurality of fluid outlets, the particular amount of time based on an amount of time necessary for the fluid pressure within the cavity to be reduced below the biasing force of at least one of the biasing assemblies.

16. The water distribution manifold of claim 15, wherein the amount of biasing force applied by the at least one of the biasing assemblies is independently adjustable by each one of the tension rings such that the biasing force applied by each one of the biasing assemblies are different from one another.

17. The water distribution manifold of claim 15, wherein the amount of biasing force applied by the at least one of the biasing assemblies is adjustable by each one of the tension rings such that the biasing force applied by each one of the biasing assemblies is the same.

18. The water distribution manifold of claim 15, wherein the fluid inlet is fluidly coupled to the fluid source via one or more fluid lines.

19. The water distribution manifold of claim 18, wherein one or more pumps fluidly coupled to the one or more fluid lines direct a flow and a pressure of the fluid received by the fluid inlet.

20. The water distribution manifold of claim 15, wherein the amount of fluid provided to the cavity via the fluid inlet and the tension of the at least one of the plurality of tension rings is controlled by a computing device based on a specific amount of fluid to be supplied to plant material.

* * * * *